Sept. 19, 1961     J. H. McILROY ET AL     3,001,196
DUAL PATTERN ANTENNA
Filed Jan. 16, 1959
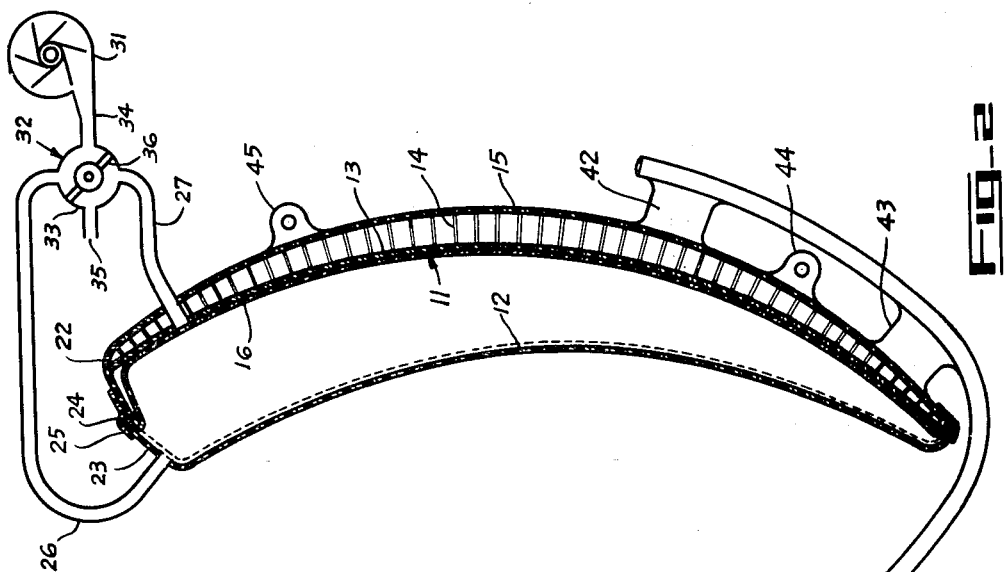
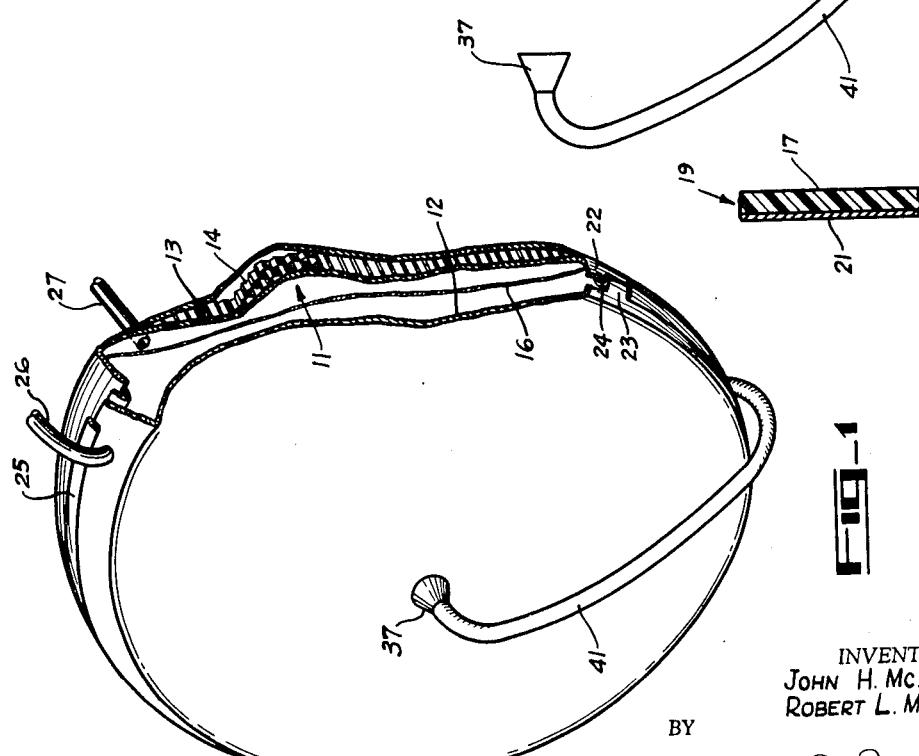
INVENTORS.
JOHN H. McILROY.
ROBERT L. MOORE.
BY
*Walter J. Jason*
ATTORNEY.

United States Patent Office 3,001,196
Patented Sept. 19, 1961

3,001,196
DUAL PATTERN ANTENNA
John H. McIlroy and Robert L. Moore, San Diego, Calif., assignors to General Dynamics Corporation, San Diego, Calif., a corporation of Delaware
Filed Jan. 16, 1959, Ser. No. 787,163
12 Claims. (Cl. 343—915)

This invention relates to antennas, and more particularly to a directive beam antenna wherein the shape of a reflector may be varied in a predetermined manner to vary the shape of the directive beam.

Radar antennas presently provided aboard fighter aircraft furnish a pencil beam type of radiation pattern, characterized by a very sharp, symmetrical directivity pattern. Such a radar beam pattern is essential for accurately intercepting a target, aiming the aircraft weapons at the target, and directing some types of air to air guided missiles at the target. However, fighter aircraft may also be required to conduct missions against surface targets wherein determination of the positions of such surface targets, as enemy ships, factories, rail lines, etc. relative to the aircraft is necessary. In addition, naval carrier based aircraft may be required to search for their aircraft carrier base when returning from a mission with the radar equipment carried aboard the aircraft. The pencil beam pattern is unsatisfactory for such surface search purposes, since such a pattern provides no radar coverage of the surface near the aircraft. It is desirable that there be provided an antenna having a directivity pattern characterized by appreciable energy transmission at large angles below the axis of the antenna, as well as high intensity transmission along the antenna axis.

It will be apparent therefore, that the radar equipment aboard fighter aircraft should provide two separate and distinct radiation patterns, namely a pencil beam, and a fan-shaped beam. Equipment required in addition to that enabling the transmission of a single beam must be light in weight, simple, reliable and rugged.

The directive beam antenna of the present invention enables the operator to select either one of two beam patterns. Exemplarily, either a pencil beam, or a fan shaped beam may be provided, employing a single radar antenna and beam shaping reflector. A reflector is provided, illuminated by a suitable feed antenna, which may selectively assume one of two shapes. Exemplarily, a first shape may be a paraboloid, providing a tight pencil shaped beam, and a second shape may be one providing a fan shaped beam according to a cosecant² cosine function. If desired, other reflector shapes may be employed.

The two reflector shapes are provided by urging a flexible metallized film or fabric reflector diaphragm against the front or rear bulkhead of a compartment. The rear bulkhead exemplarily, may be shaped to provide a pencil beam, and the front bulkhead may be shaped to provide a fan shaped beam. The compartment is substantially hermetically sealed, and the flexible metallized film of fabric diaphragm is substantially impervious. Conduits are provided on each side of the diaphragm, whereby a gas may be introduced at the rear of the diaphragm to urge it against the front bulkhead of the compartment or at the front to urge the diaphragm against the rear bulkhead of the compartment. It is therefore, an object of this invention to provide an antenna selectively furnishing two distinct beam patterns.

Another object of this invention is to provide an antenna having a radiant energy reflecting surface adapted to be quickly and conveniently adjusted.

Another object of this invention is to provide an antenna having a radiant energy reflecting surface which may be alternately adjusted to selectively provide either of two beam patterns.

Another object of this invention is to provide an antenna having a flexible radiant energy reflecting surface enclosed in a chamber.

Another object of this invention is to provide an antenna having a radiant energy transparent chamber with two bulkheads, a flexible radiant energy reflecting surface enclosed in the chamber, and selective means to urge the reflecting surface against either bulkhead.

Another object of this invention is to provide an antenna capable of selectively furnishing two distinct beam patterns, which is light in weight, rugged, reliable, simple to build and operate, provide accurately shaped beams, and is inexpensive to build.

Other objects and features of this invention will become apparent from the following specification and appended drawings, wherein:

FIGURE 1 is a perspective view, partially cut away, of an antenna constructed in accordance with this invention, FIGURE 2 is a cross-sectional view of the antenna of FIGURE 1, and FIGURE 3 is a detail cross section of a radiant energy reflecting diaphragm suitable for employment in connection with the antenna of this invention.

Referring to the drawings, wherein like numbers designate the same parts in the various figures, a hermetically sealed chamber is formed by rear bulkhead 11 and front bulkhead 12. Rear bulkhead 11 comprises an inner plastic resin reinforced fiberglass wall 13 molded to the desired reflecting curve, a paper honeycomb core reinforcement 14 bonded to the inner sheet, and an outer plastic resin reinforced fiberglass wall 15 bonded to the honeycomb core. Front bulkhead 12 is formed of plastic resin reinforced fiberglass, molded along the inner surface to the desired radiant energy reflecting shape.

A radiant energy reflecting diaphragm 16 is disposed between rear bulkhead 11 and front bulkhead 12. In one embodiment, illustrated in cross-section in FIGURE 3, diaphragm 16 comprises a sheet 17 of a polyester film such as polyethylene terephthalate, metallized in known manner on the surface facing front bulkhead 12 with a thin layer 21 of aluminium. In another embodiment, not shown, the diaphragm 16 consists of a stretchable fabric, exemplarily woven of nylon, impregnated with silicone rubber and sprayed with a metal such as aluminium. The metallic surface is covered with a protective layer of nylon fabric cemented thereto.

The rear bulkhead 11 is fabricated by cementing honeycomb core 14 between walls 13 and 15 of fiberglass cloth impregnating the fiberglass with a suitable plaster resin, and curing the bulkhead 11 over a parabolic shaped male die to produce a paraboloid reflecting surface. Circumferential wall 22 is provided about the periphery of rear bulkhead 11 to enable hermetic sealing of the bulkheads in a manner disclosed hereinbelow.

Front bulkhead 12 is fabricated of fiberglass cloth molded over a suitable female die adapted to provide, exemplarily, a cosecant² cosine beam pattern. The cloth is impregnated with a suitable plastic resin, and cured. Front bulkhead 12 is provided with a circumferential wall 23 adapted to overlap circumferential wall 22. Rear bulkhead 11 and front bulkhead 12 are assembled with diaphragm 16 therebetween. Diaphragm 16 is provided with a overlapping section 24, adapted to overlay circumferential wall 22. As illustrated, circumferential wall 23 overlays diaphragm overlapping section 24 and circumferential wall 22. A bonding strap 25 is placed about the circumference of the assembly, overlapping circumferential walls 22 and 23, impregnated with a suitable plastic resin, and cured, thereby providing a hermetically sealed chamber containing diaphragm 16.

The beam desired is selected by causing reflective diaphragm 16 to conform to the shape of the inner surface of rear bulkhead 11 or of front bulkhead 12. In order to enable diaphragm 16 to conform to the inner surface of rear bulkhead 11, a gas, exemplarily air, under pressure is introduced into the portion of the hermetically sealed chamber between diaphragm 16 and front bulkhead 12 by means of a conduit 26 molded into front bulkhead 12. Similarly, to enable diaphragm 16 to conform to the inner surface of front bulkhead 12, gas under pressure is introduced into the portion of the hermetically sealed chamber between diaphragm 16 and rear bulkhead 11 by means of a conduit 27 molded into rear bulkhead 11. Gas under pressure, conveniently air, is supplied by a suitable pressure source such as pump 31. A valve assembly 32, shown schematically in FIGURE 32, includes a hollow casing 33 opening to an inlet conduit 34 connected to pump 31, conduit 26 connected to the front portion of the hermetically sealed chamber, conduit 27 connected to the rear portion of the hermetically sealed chamber, and a venting conduit 35 connected to the atmosphere. A movable vane 36 is mounted for rotation within valve casing 33, whereby inlet conduit 34 may be selectively connected to either one of conduits 26 or 27 by rotation thereof, while the other one of conduits 26 or 27 is vented to the atmosphere through conduit 35. As will be apparent, other types of selective valves may be employed, such as spool valves, in place of the valve 32 illustrated.

Reflecting surface 21 of diaphragm 16 cooperates with a suitable primary antenna such as electromagnetic horn antenna 37 connected to a suitable receiver, transmitter, or radar apparatus (not shown) through rigid waveguide 41. The position of horn 37 with respect to the remainder of the apparatus is fixed at the desired point, such as the focus of the paraboloid curve of the front wall 13 of rear bulkhead 11, since rigid waveguide 41 is suitably fastened to rear wall 15 of rear bulkhead 11 by means of brackets 42 and 43 molded integrally therewith. Eye brackets 44 and 45 also integrally molded into rear wall 15 of rear bulkhead 11, enable mounting the antenna assembly to a suitable traversing mechanism, not shown.

The operator may select either beam at will simply by adjusting the angular position of vane 36. Thus, as illustrated, diaphragm 16 may be urged against front wall 13 of rear bulkhead 11, conforming to the parabolic shape thereof, by enabling compressed air from pump 31 and conduit 34 to be applied to conduit 26, and into the interior of the hermetically sealed chamber in front of diaphragm 16. Simultaneously, the portion of the chamber to the rear of diaphragm 16 is vented to the ambient atmosphere through conduit 27, valve 32, and conduit 35. Conversely, rotation of vane 36 clockwise through 45 degrees connects the pump 31 and conduit 34 to the portion of the hermetically sealed chamber to the rear of diaphragm 16 through conduit 27. Simultaneously, conduit 26, connected to the front portion of the hermetically sealed chamber, is vented to the surrounding atmosphere through valve 32 and conduit 35. Thus, diaphragm 16 is urged against front bulkhead 12, conforming thereto, and providing a cosecant$^2$ cosine beam pattern.

Since many changes may be made in the above construction and many apparently widely different embodiments of this invention could be made without departing from the scope thereof, it is intended that all matter contained in the above description and in the accompanying drawings shall be interpreted as illustrative only, the true spirit and scope of this invention being limited only by the accompanying claims.

What we claim is:

1. An antenna comprising first and second bulkheads defining a chamber, a flexible reflective diaphragm in said chamber between said first and second bulkheads, and means for selectively urging said diaphragm against one of said first and second bulkheads.

2. An antenna comprising first and second shaped bulkheads defining a chamber, a flexible reflective diaphragm in said chamber between said first and second bulkheads, and means for selectively urging said diaphragm against one of said first and second shaped bulkheads whereby said diaphragm assumes the shape of the selected bulkhead.

3. A radiant energy reflector comprising first and second shaped bulkheads transparent to radiant energy defining a chamber, a flexible reflective diaphragm in said chamber between said first and second bulkheads, and means for selectively urging said diaphragm against one of said first and second shaped bulkheads whereby said reflective diaphragm assumes the shape of the selected bulkhead.

4. A radiant energy reflector comprising a first bulkhead having a first shape, a second bulkhead having a second shape, said bulkheads defining a chamber, a flexible reflective diaphragm in said chamber between said first and second bulkheads, and means for selectively urging said diaphragm against one of said first and second bulkheads to assume the shape thereof.

5. A radiant energy reflector comprising first and second bulkheads defining a chamber, said first bulkhead having a first predetermined shape, said second bulkhead having a second predetermined shape, said bulkheads being transparent to said radiant energy, a flexible reflective diaphragm in said chamber between said first and second bulkheads, and means for selectively urging said diaphragm against one of said first and second bulkheads to assume the predetermined shape thereof.

6. A radiant energy reflector comprising first and second bulkheads defining a chamber, said first bulkhead having a first predetermined shape, said second bulkhead having a second predetermined shape, said bulkheads being transparent to said radiant energy, a flexible reflective diaphragm in said chamber between said first and second bulkheads, means for fastening said bulkheads and said diaphragm to one another to seal said chamber, and means for selectively urging said diaphragm against one of said first and second bulkheads to assume the predetermined shape thereof.

7. A radiant energy reflector comprising first and second bulkheads defining a chamber, said first bulkhead having a first predetermined shape enabling a first beam pattern, said second bulkhead having a second predetermined shape enabling a second beam pattern, said bulkheads being transparent to said radiant energy, a flexible reflective diaphragm in said chamber between said first and second bulkheads, means for fastening said bulkheads and said diaphragm to one another to seal said chamber, and pneumatic means for selectively urging said diaphragm against one of said first and second bulkheads to assume the predetermined shape thereof and provide the selected beam pattern.

8. A microwave antenna reflector comprising first and second bulkheads of dielectric material defining a chamber, said first bulkhead having a first predetermined shape enabling a first beam pattern, said second bulkhead having a second predetermined shape enabling a second beam pattern, a flexible diaphragm having a metallic reflecting surface in said chamber between said first and second bulkheads, means for fastening said bulkheads and said diaphragm to one another to seal said chamber, and pneumatic means for selectively urging said diaphragm against one of said first and second bulkheads to assume the predetermined shape thereof and provide the selected beam pattern.

9. A microwave antenna reflector comprising first and second bulkheads of dielectric material defining a chamber, said first bulkhead having a first predetermined shape enabling a first beam pattern, said second bulkhead having a second predetermined shape enabling a second beam pattern, a flexible diaphragm having a metallic reflecting surface in said chamber between said first and second bulkheads, means for fastening said bulkheads and said diaphragm to one another to seal said chamber, and means for selectively applying fluid pressure to said chamber on one side of said diaphragm for selectively urging said diaphragm against one of said first and second bulkheads to assume the predetermined shape thereof and provide the selected beam pattern.

10. A microwave antenna reflector comprising first and second bulkheads of dielectric material defining a chamber, said first bulkhead having a first predetermined shape enabling a first beam pattern, said second bulkhead having a second predetermined shape enabling a second beam pattern, a flexible diaphragm having a metallic reflecting surface in said chamber between said first and second bulkheads, means for fastening said bulkheads and said diaphragm to one another to seal said chamber, a first fluid conduit in said first bulkhead, a second fluid conduit in said second bulkhead and means for selectively applying fluid pressure to one of said conduits for urging said diaphragm against one of said first and second bulkheads to assume the predetermined shape thereof and provide the selected beam pattern.

11. A microwave antenna reflector comprising first and second rigid bulkheads of dielectric material defining a chamber, said first bulkhead having a first predetermined shape enabling a first beam pattern, said second bulkhead having a second predetermined shape enabling a second beam pattern, a flexible diaphragm having a metallic reflecting surface in said chamber between said first and second bulkheads, means for fastening said bulkheads and said diaphragm to one another to seal said chamber, a first fluid conduit in said first bulkhead, a second fluid conduit in said second bulkhead, a fluid pressure source, and a valve for selectively connecting one of said conduits to said fluid pressure source for urging said diaphragm against one of said first and second bulkheads to assume the predetermined shape thereof and provide the selected beam pattern.

12. A microwave antenna reflector comprising first and second rigid bulkheads of dielectric material defining a chamber, said first bulkhead having a first predetermined shape enabling a first beam pattern, said second bulkhead having a second predetermined shape enabling a second beam pattern, a flexible diaphragm having a metallic reflecting surface in said chamber between said first and second bulkheads, means for fastening said bulkheads and said diaphragm to one another to seal said chamber, a first fluid conduit entering said chamber through said first bulkhead, a second fluid conduit entering said chamber through said second bulkhead, a fluid pressure source, and a valve for selectively connecting one of said conduits to said fluid pressure source and connecting the other of said conduits to the atmosphere, thereby urging said diaphragm against one of said first and second bulkheads to assume the predetermined shape thereof and provide the selected beam pattern.

References Cited in the file of this patent
UNITED STATES PATENTS

| | | |
|---|---|---|
| 908,838 | Brown | Jan. 5, 1909 |
| 2,403,915 | Evans | July 16, 1946 |
| 2,443,643 | Schelleng | June 22, 1948 |
| 2,760,407 | Bauersfeld | Aug. 28, 1956 |
| 2,814,038 | Miller | Nov. 19, 1957 |